(12) United States Patent
Foti (10) Patent No.: US 8,341,666 B2
(45) Date of Patent: Dec. 25, 2012

(54) ADM ENABLED OITF, SUPPORTING IPTV INFRASTRUCTURE AND ASSOCIATED METHODS

(75) Inventor: George Foti, Dollard-des-Ormeaux (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 337 days.

(21) Appl. No.: 12/609,597

(22) Filed: Oct. 30, 2009

(65) Prior Publication Data

US 2011/0030002 A1 Feb. 3, 2011

Related U.S. Application Data

(60) Provisional application No. 61/229,328, filed on Jul. 29, 2009.

(51) Int. Cl.
*H04N 7/10* (2006.01)
(52) U.S. Cl. ............................... 725/34; 735/35; 735/36
(58) Field of Classification Search ................ 725/32–36
See application file for complete search history.

(56) References Cited

U.S. PATENT DOCUMENTS

| | | |
|---|---|---|
| 2005/0060229 A1 | 3/2005 | Riedl et al. |
| 2006/0075449 A1 | 4/2006 | Jagadeesan et al. |
| 2008/0313669 A1 | 12/2008 | Acharya et al. |

FOREIGN PATENT DOCUMENTS

| | | |
|---|---|---|
| WO | 2008/117191 A1 | 10/2008 |
| WO | 2008/156575 A1 | 12/2008 |
| WO | 2009/042558 A2 | 4/2009 |

OTHER PUBLICATIONS

Open IPTV Forum, Open IPTV Forum—Functional Architecture—V 1.1, XP-007906507, Jan. 15, 2008, pp. 1-141.
Society of Cable Telecommunications Engineers, Engineering Committee—Digital Video Subcommittee, American National Standard, ANSI/SCTE 130-3 2008a, Digital Program Insertion—Advertising Systems Interfaces—Part 3 , Ad Management Service (ADM) Interface, Jan. 1, 2008, pp. 1-236.
PCT Search Report from corresponding application PCT/IB2010/053389.

*Primary Examiner* — Hunter B Lonsberry (74) *Attorney, Agent, or Firm* — Dilip C. Andrade; Ericsson Canada Inc.

(57) ABSTRACT

A system and method for the automated discovery of advertisement decision services and advertisement management services employs an advertisement application server which receives the address of an advertisement management service from an IPTV Controller during the registration phase. The advertisement application server then begins the configuration process by informing the advertisement decision server of the availability of a new advertisement management service. Additionally, an OITF having an embedded ADM makes use of markers in a received content stream to identify the location at which an advertisement is to be inserted, requests and receives advertisements from an ADS, and renders a video stream based on the received content and the received advertisement.

24 Claims, 5 Drawing Sheets

ADM ENABLED OITF, SUPPORTING IPTV INFRASTRUCTURE AND ASSOCIATED METHODS

CROSS REFERENCE TO RELATED APPLICATIONS

This application claims the benefit of priority to U.S. Provisional Patent Application No. 61/229,328 filed Jul. 29, 2009 entitled "SCTE-130-3 Based Target ADS discovery procedure for ADM-based end devices" the contents of which are expressly incorporated herein by reference.

FIELD OF THE INVENTION

This invention relates generally to configuration of nodes in an IPTV network.

BACKGROUND OF THE INVENTION

The Society of Cable Telecommunications Engineers (SCTE) has defined a standard known as SCTE 130-3 which defines an interface that can be used for Digital Program Insertion. According to this standard, content (such as a television program) to be delivered to users is stored digitally, and instead of including advertisements inline in the stored content, the stored content includes markers indicating the relevant location for advertisements. When the program is being transmitted advertisements can be selected on the fly for insertion at the relevant locations. The use of an extensible markup language (XML) schema allows for identification not only of placement opportunities but also information such as placement decision data and placement related event data that is exchanged between two network elements, the Advertisement Management Service (ADM) and the Advertisement Decision Service (ADS). The role of these nodes, and the manner in which they function is described in detail in the SCTE 130 family of specifications (available at http://www.scte.org/)

As defined in the SCTE 130 standards, these nodes are considered to be part of the network infrastructure, and are implemented as network based servers. As such, configuration of the servers is performed by system administrators. The ADM and ADS are statically configured, have fixed IP addresses and are expected to have high levels of availability.

One drawback to this conventional setup is that the ADM and ADS become network elements that do not provide flexibility in their use given that their addresses have to be known in advance and static. This presents limitations to the deployment of SCTE-130 in architectures where any of the 2 addresses is dynamic in nature.

In Internet Protocol Television (IPTV) defined standards, the Open IPTV Function node (OITF) serves as the user's interface to the IP Multimedia Subsystem (IMS) network. The connectivity of the node is not considered to be reliable, as the user can cycle power to the device, and the OITF can also be implemented in a terminal such as a computer (including mobile devices) that does not have continuous network functionality. The OITF is a logical location for an ADM as it would allow SCTE 130-3 standard compliant nodes to be used to insert advertisements into content-on-demand (COD) stream, and it allows for more refined and a granular information to be provided to the ADS so that advertisements relevant to a particular user can be selected. However because the IP address of the OITF is not fixed and because the OITF can be moved from location to location the OITF does not conform to the requirements of a standards compliant ADM.

An ADM that would be tolerant of an unreliable connection and could be implemented at the user premises and possibly integrated with end equipment such as an OITF would provide numerous advantages and allow it to be used in COD sessions, and in all IPTV, and non-IPTV applications requiring support for target advertisements. Presently this is prevented by difficulties in implementation, as the ADS would need to be able to find the ADM when required, and would also be required to recognize the ADM when initialized at a different address (in case of mobility). The ADM cannot be provided with a static address for an ADS, as the ADS that it connects to can be changed based on geography or selection of networks.

It is, therefore, desirable to provide a mechanism for automated configuration of both ADS and ADM nodes in a network which would allow for a mobile or end-user-equipment version of an ADM.

SUMMARY OF THE INVENTION

It is an object of the present invention to obviate or mitigate at least one disadvantage of the prior art.

In a first aspect of the present invention, there is provided a method of registering an advertising management server enabled Open IP TV Terminal Function on an Internet Protocol Television network. The method comprises receiving registration information associated with an Open IP TV Terminal Function (OITF); determining, in accordance with information contained in the received registration information, that the OITF associated with the received registration information is an advertising management server (ADM) enabled OITF; and transmitting ADM information to an advertising application server.

In an embodiment of the first aspect of the present invention, the method further includes the step of creating ADM information in accordance with the received registration information, optionally the ADM information includes a network address uniquely associated with the ADM-enabled OITF. In another embodiment, the step of transmitting the ADM information includes transmitting the ADM information to an Advertising Application Server for use in registering the ADM-enabled OITF with an Advertisement Selection Server. In a further embodiment, the ADM-enabled OITF is compliant with Society of Cable Telecommunications Engineers defined SCTE-130 family of standards.

In a second aspect of the present invention, there is provided a method of registering an advertising management server enabled Open IP TV Terminal Function with a Advertisement Selection server. The method comprises receiving advertisement management server (ADM) information from an Internet Protocol Television Control Server; extracting an ADM address from the received ADM information; registering an ADM associated with the extracted address with an Advertisement Selection Server (ADS).

In an embodiment of the second aspect of the present invention, the step of registering includes registering the ADM using predefined operations and maintenance processes. In another embodiment, the method further includes the steps of extracting configuration information from the ADM information and configuring the ADM registration with the ADS in accordance with the extracted configuration information.

In a third aspect of the present invention, there is provided an Internet Protocol Television Control Server (IPTV CS) for registering an advertising management server (ADM) enabled Open Internet Protocol Television Terminal Function (OITF). The IPTV CS comprises an OITF interface, a processor and an advertisement application server interface. The OITF interface receives registration information from an OITF through an Internet Multimedia Subsystem network. The processor registers the OITF in response to receipt of the registration request, and determines that the OITF is an ADM-enabled OITF. The advertisement application server (AAS) interface transmits address information associated with an ADM-enabled OITF to an AAS in response to determination that a registered OITF is an ADM-enabled OITF.

In an embodiment of the third aspect of the present invention, the processor includes means to generate ADM registration information on the basis of the registration request received by the OITF interface in response to determining that the OITF is an ADM-enabled OITF. In another embodiment, the ADM registration information includes the address associated with the ADM-enabled OITF and optionally, the AAS interface includes means to transmit the address information encapsulated in the ADM registration information.

In a fourth aspect of the present invention, there is provided an Advertising Application Server for configuring an Advertising Decision Service (ADS). The Advertising Application Server comprises an IPTV CS interface, a processor and an operations an maintenance engine. The Internet Protocol Television Server (IPTV CS) interface receives registration information for an advertising management server (ADM) from an IPTV CS. The processor extracts an address associated with the ADM from the received registration information. The operations and maintenance engine configures the ADS to recognize the availability of an ADM at the extracted address.

In an embodiment of the fourth aspect of the present invention, the processor includes means to extract additional configuration information from the received registration information, and optionally the operations and maintenance engine includes means to configure the ADS in accordance with the additional configuration information.

In a fifth aspect of the present invention there is provided an Internet Protocol Television Control Server comprising an OITF interface, a processor and an operations and maintenance engine. The OITF interface receives a registration request from an OITF. The processor registers the OITF in response to receipt of the registration request, determines that the OITF is an ADM-enabled OITF, and generates ADM registration information having an address associated with the ADM-enabled OITF. The operations and maintenance engine configures an Advertising Decision Server to recognize the ADM-enabled OITF at the associated address using the ADM generated registration information.

In a sixth aspect of the present invention, there is provided an Open Internet protocol television Terminal Function (OITF) for receiving a content stream having markers indicating locations for advertisements and for inserting advertisements into the content stream at the indicated locations. The OITF comprises an ADS interface, an IPTV interface and a processor. The Advertisement Decision Service (ADS) Interface communicates with an Advertisement Decision Service to request and receive the advertisements. The Internet Protocol Television (IPTV) interface communicates with nodes of an Internet protocol Multimedia Subsystem to receive the content stream. The processor identifies markers associated with the content stream received through the IPTV interface, requests an advertisement through the ADS interface, inserts an advertisement received through the ADS interface in response to the request into the content stream at a location, and provides as an output a video stream incorporating the received advertisements and the received content stream.

In an embodiment of the sixth aspect of the present invention, the Advertisement Decision Service Interface is for communicating with an SCTE-130 compliant Advertisement Decision Service. In another embodiment, the ADS interface and the IPTV interface are integrated. In a further embodiment, the markers indicating locations for advertisements are provided in a markup language file associated with the content stream, the markup language file is received by the IPTV interface and is processed by the processor to identify the locations in the content stream where an advertisement is to be inserted. In further embodiments the content stream is a television program or a game.

In the present invention, there is provided a method whereby a terminal registers with a control server which in turn notifies an advertisement application server. The application server obtains an address associated with the terminal from the notification, and configures an advertisement decision service using the address. In some embodiments, the advertisement decision service, upon being so configured, performs an exchange discovery process with an advertisement management service accessible at the address provided during configuration. This exchange discovery process is optionally a process compliant with public standards such as SCTE 130. After commencing an exchange discovery process, the advertisement decision service can optionally begin a registration process that can be compliant with public standards such as SCTE 130.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to a process for the automated discovery and configuration of the Advertising Decision Server (ADS) and ADvertisement Management service (ADM) in a data network such as an IMS network.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

In the present invention, ADM functionality is implemented in end user equipment such as the OITF (though it could also be implemented in a mobile device, the IMS Gateway, integrated into another piece of end user equipment or provided in a discrete user premises node). To allow a dynamically configured and possibly mobile ADM to interoperate with existing SCTE-130 compliant ADS nodes, a new functional element referred herein as the Advertising Application Server serving the OITF is introduced. This provides a connectivity solution that allows the OITF, with dynamic address, to interact with the ADS in a manner fully compliant with the SCTE-130 standards. By providing ADM services at the OITF, advertisements can be inserted into content on demand streams, or other applications, when needed, and the location of the OITF can be taken into account in the advertisement selection process providing the ability to select advertisements that are locally focused. By having the OITF host the ADM, we can extend the applicability of SCTE-130 standards to architectures not envisaged in the current standard. As noted above, the ADM and ADS are required by standards to able to identify each other. The identification process has conventionally been performed by specifying the address of the ADS in the ADM configuration files and vice versa. Because the address of the ADM can be different every time that it is powered on, and due to the fact that the ADM may need to connect to a different ADS in different geographic locations, it is presently preferred that an automated configuration process is employed.

To perform the configuration process, an Advertisement Application Server (AAS) is employed. One skilled in the art will appreciate that though in some of the Figures, AAS is illustrated as a distinct network element it can be incorporated in another node in the network (such as the IPTV Control Server (IPTV CS)) without departing from the scope of the present invention. The AAS makes use of the registration of an ADM-enabled OITF information received from the IPTV CS to automate a configuration process at the ADS. This allows an ADS to discover an ADM and to gracefully deregister an ADM when it is taken down (e.g. device powered down).

Figure 1:
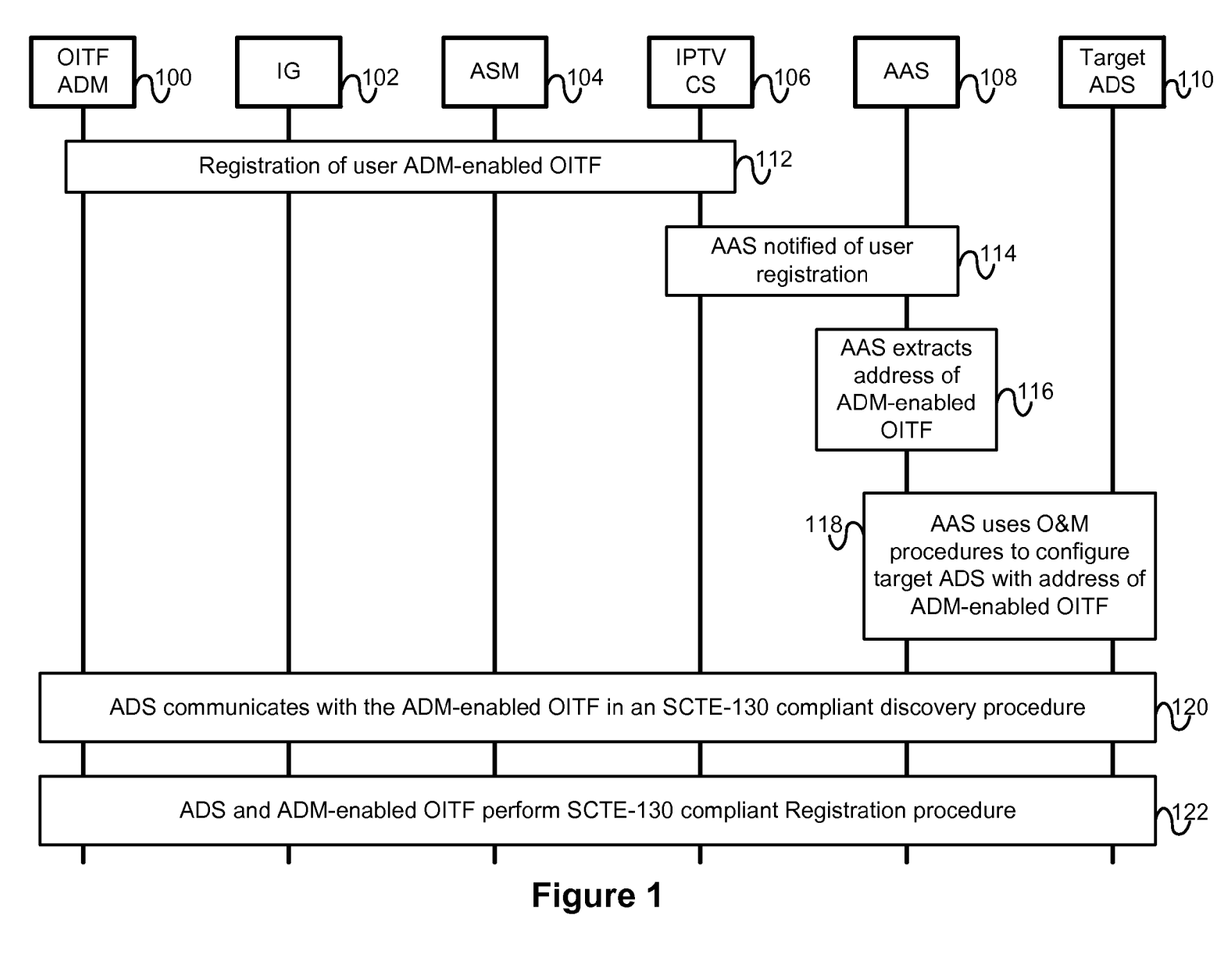
FIG. 1 illustrates a process for the discovery of an ADM by an ADS.

FIG. 1 provides an exemplary message flow across numerous nodes and a method whereby an OITF is registered into an IMS network, and the IPTV system then makes use of an SCTE-130 compliant registration process for an ADM hosted in the OITF. One skilled in the art will appreciate that for the sake of simplicity this process may be referred to as an OITF registering with an IPTV Control Server, which in turn makes use of the SCTE-130 compliant registration process. It will be understood by those skilled in the art that the OITF does not necessarily directly register with the IPTV Control Server, and instead it is a network notification that allows the IPTV Control Server to recognize the registration of the OITF.

OITF 100 includes ADM functionality, and is also referred to as an ADM-enabled OITF. This element is both a user controlled terminal that can receive content streams from an upstream network based content source (not shown) and additionally performs ADM related functions by recognizing the location of commercials in a content stream and communicating with an ADS to obtain commercials. Equally, it can be configured with policies to identify placement opportunities for ads in any context (gaming, Content streaming, etc.). The OITF 100 connects on a local network to IMS Gateway 102 which, as will be well understood by those skilled in the art, serves as a gateway between the local network and the IMS network. The IG 102 also performs a number of additional functions in an IPTV context that are not germane to the present discussion as will be well understood by those skilled in the art. The Authentication and Session Management node (ASM) 104 is used to authenticate the OITF 100 before it connects to IPTV CS 106. In the illustrated embodiment of FIG. 1, IPTV CS 106 performs the same steps required of a standard IPTV CS, but it also additionally interacts with Advertising Application Server (AAS) 108 to provide AAS 108 with registration information associated with an ADM-enabled OITF 100. AAS 108 serves as an intermediary between the IPTV CS 106 and the target ADS 110. Using the information provided by IPTV CS 106, AAS 108 can make use of standard operations and maintenance (O&M) routines to configure the target ADS 110. ADS 110 is a conventional ADS that selects advertisements from a stored repository in accordance with criteria provided by an ADM. ADS is configured to connect to at least one ADM so that a registration process defined by SCTE-130 can be carried out. The ADS 110, in order to begin this registration process must be configured with the address of the ADM, in this case ADM-enabled OITF 100. Other information can be used in various embodiments of this configuration process.

As illustrated in FIG. 1, in step 112 ADM-enabled OITF 100 registers with the IMS network, and is recognized by IPTV CS 106, and all other nodes with which registration is required (e.g. IG 102 and ASM 104). In the registration process, IPTV CS 106 becomes aware when an OITF registers through well known procedures. It then determines that OITF 100 is an ADM-enabled OITF. IPTV CS 106 then notifies AAS 108 of the registration in step 114, and provides ADM information such as the ADM address, which in this case is the address of ADM-enabled OITF 100. AAS 108 extracts the ADM address from the ADM information in step 116, and uses O&M procedures in step 118 to configure the ADS 110.

In step 120, ADS 110 communicates with ADM-enabled OITF 100. In a presently preferred embodiment, this communication is done using SCTE-130 defined discovery procedures. The discovery procedures allow the ADS 110 and the ADM-enabled OITF 100 to recognize each other, the ADS 110 and the ADM-enabled OITF 100 perform SCTE-130 compliant registration procedures in step 122.

By following a process as outlined above, the registration of OITF 100 with IPTV CS 106 results in ADS 110 becoming aware of the availability of an ADM at OITF 100. This allows ADS 110 to perform an SCTE-130 compliant registration process with the ADM-enabled OITF 100.

One skilled in the art will appreciate that the ADM functionality of OITF 100 behaves like a network ADM from an SCTE-130 point of view. In such a case, the ADM functionality can use conventional means to ensure that advertisement related information from ADS 110 is handled appropriately.

By using an AAS-controlled configuration process to configure ADS 110, and then employing existing ADS-based discovery and registration routines, the ADS 110 and ADM-enabled OITF 100 can be configured without user intervention. Conventional SCTE based configuration procedures allow ADS and ADM nodes to standardize on the XML schema used to request advertisements. This schema defines both the information and the format of the information provided to ADS 110 for use in the advertising selection process. The AAS functionality can be integrated into other nodes, such as the IPTV Controller 106, though it may be preferable to have it in a separate element so that it can more easily employ proprietary O&M procedures specific to a particular implementation of the ADS 110.

Figure 2:
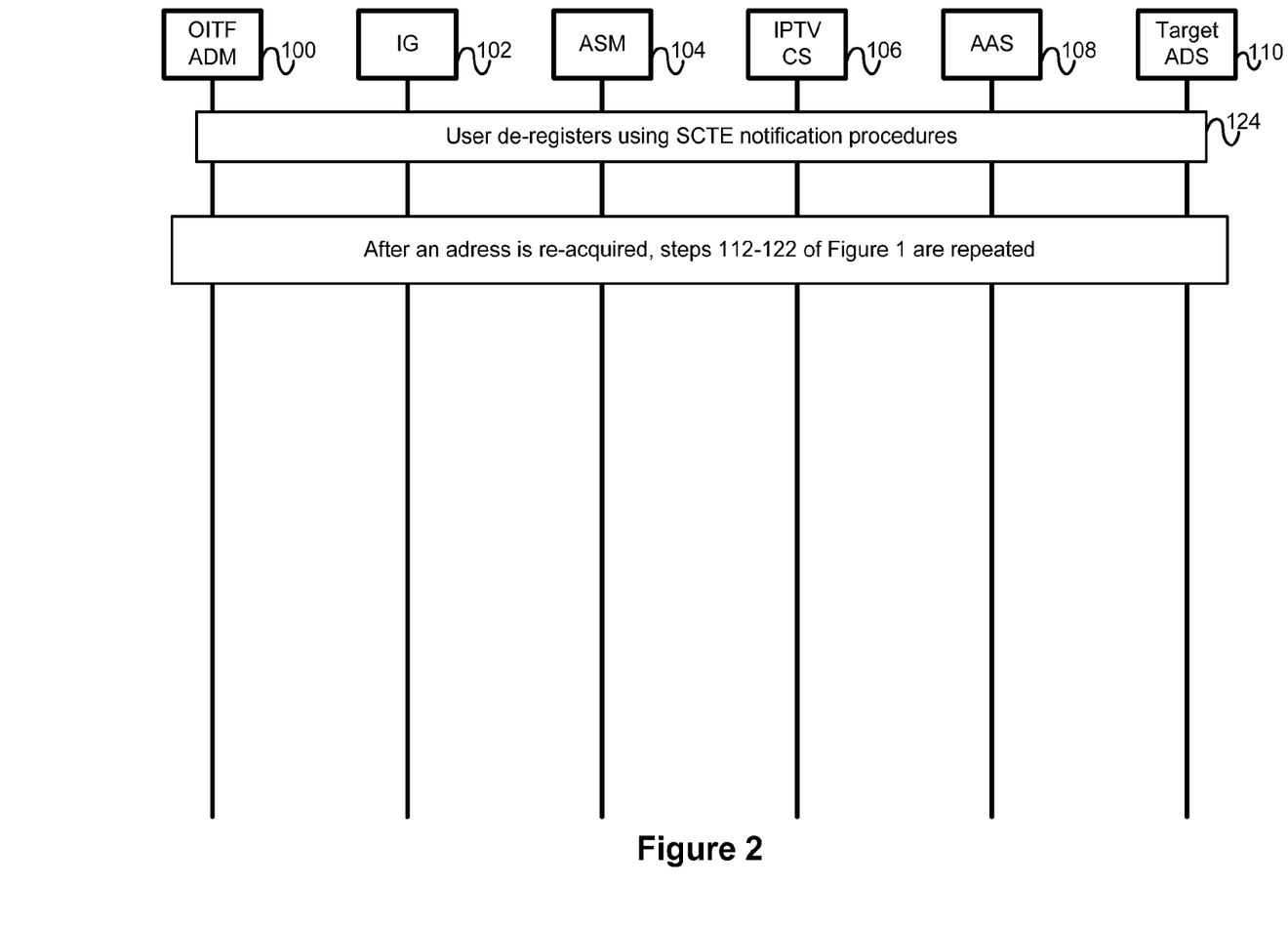
FIG. 2 illustrates a process for handling the change in an IP address associated with an ADM.

Those skilled in the art will appreciate that in some environments the address assigned to ADM-enabled OITF 100 can change. In one example, OITF 100 could be a mobile platform that is required to change its address as it moves to a different network, while in another example, resetting the network connection of OITF 100 can result in the device being assigned a different address under a dynamic addressing protocol. FIG. 2 illustrates a call flow employed when an address change is detected by OITF 100. The same network nodes illustrated in FIG. 1 are illustrated again in FIG. 2. In step 124 the ADM-enabled OITF 100 determines that its address has changed, and issues a de-registration message to the network. Simultaneously, the ADM-enabled OITF 100 de-registers from the ADS 110 declaring its unavailability to the ADS 110 through a separate deregistration process carried out at ADS 110 and preferably using existing SCTE-130 procedures. Upon the completion of the de-registration in step 124, steps 112-122 of FIG. 1 are repeated. Repeating the process of FIG. 1 ensures that the OITF 100 will re-register with the IPTV Controller 106 under its new address. The IPTV CS in turn informs the AAS 108 of the new address which uses O&M procedures to configure ADS 110 as previously described.

One skilled in the art will appreciate that the registration information provided by OITF 100 to IPTV CS 106, such as the information provided in step 112 of FIG. 1, will in a presently preferred embodiment include an indication that OITF 100 is an ADM-enabled OITF. This indication can take many forms, but it allows an IPTV CS to determine that an OITF is ADM-enabled. Alternatively if this indication is lacking, then the IPTV CS 106 can consult the subscribe profile in its data base to validate the profile of the registered user and the associated device capabilities. If a non-ADM-enabled OITF registers, the ADS 110 will not be able to properly perform either the discovery step 120 or the registration step 122. One skilled in the art will thus interpret mention of a step determining that an OITF is ADM-enabled to include embodiments where the determination is done in advance, in essence a predetermination. Finally, an identifier uniquely associated with the OITF 100 can allow the IPTV CS 106 to determine the status using a lookup table, or based on intrinsic properties of the identifier (e.g. a date of manufacture if all OITF units produced after a defined date are treated as ADM-enabled).

Figure 3:
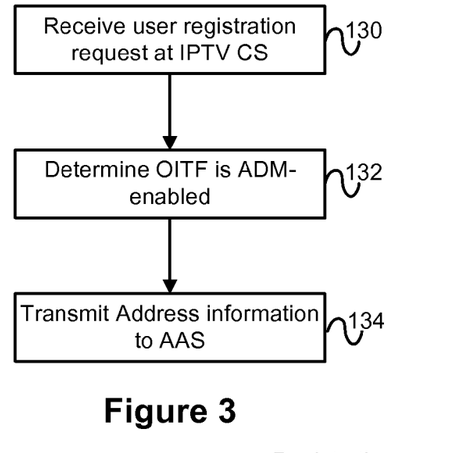
FIG. 3 is a flowchart illustrating a method of the present invention.

FIG. 3 illustrates a method of the present invention carried out at the IPTV CS 106. In step 130, the user registration request is received. In step 132, a determination is made that the OITF submitting the registration request is ADM-enabled. One skilled in the art will appreciate that as noted above, this step can be done in advance or in accordance with the information submitted with the registration request, or through database lookup. In step 134, the address of the ADM-enabled OITF is transmitted to the AAS. One skilled in the art will appreciate that the address information can be transmitted either on its own or as a part of ADM configuration information. The generic term ADM information can also be used to refer to either an ADM address or ADM configuration information which includes the ADM address.

Figure 4:
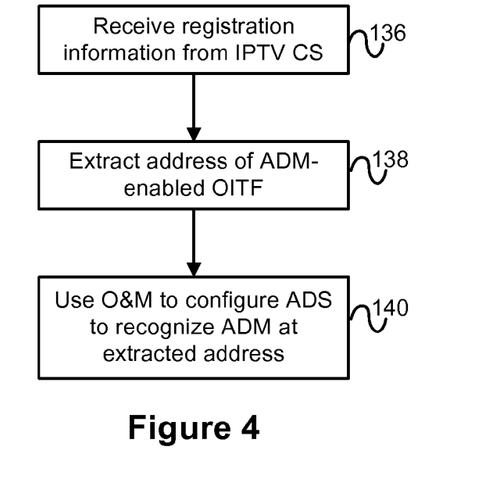
FIG. 4 is a flowchart illustrating a method of the present invention.

FIG. 4 illustrates a method of the present invention that can be carried out at AAS 108. This method is preferably preceded by the method carried out at the IPTV CS 106 outlined in FIG. 3. In step 136 registration information for an ADM is received. Preferably, the registration information is received for an ADM-enabled OITF, such as OITF 100 and is received from a node such as IPTV CS 106. In step 138 the address of an ADM, in the presently preferred embodiment the ADM being part of an ADM-enabled OITF, is extracted from the received registration information. In step 140 operations and maintenance (O&M) procedures are used to configure the ADS, such as ADS 110, to recognize an ADM at the extracted address.

One skilled in the art will appreciate that carrying out the methods of FIG. 3 and FIG. 4 allows an ADM-enabled OITF to register with the IPTV CS and have the ADM function of the OITF recognized by a network-based ADS. Upon being recognized by a network-based ADS, the ADM function of the OITF will be able to perform standardized registration procedures so that the ADM and ADS will be able to communicate with each other in the future using SCTE-130 defined procedures.

Figure 5:
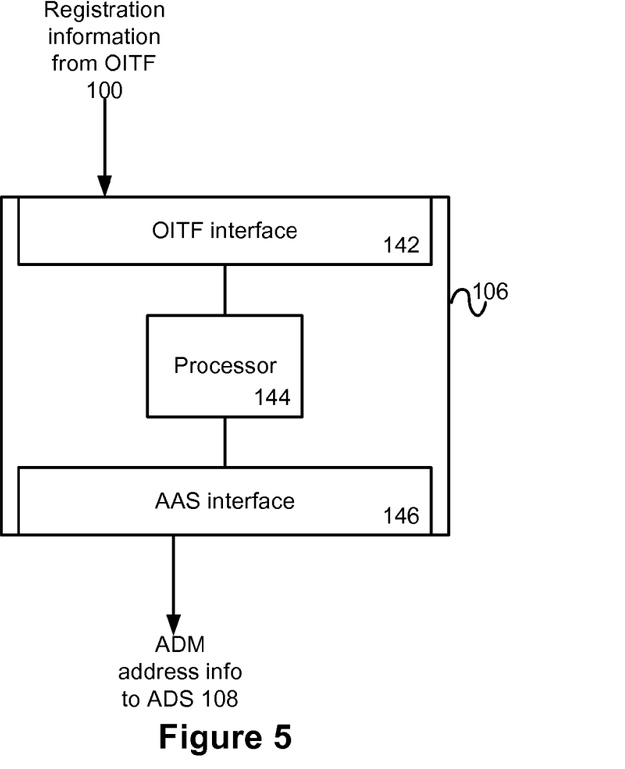
FIG. 5 is a block diagram illustrating an exemplary embodiment of a system of the present invention.

FIG. 5 is a block diagram illustrating an exemplary IPTV CS of the present invention. IPTV CS 106 includes OITF Interface 142, processor 144 and AAS interface 146. Registration information regarding OITF 100 is received by OITF Interface 142, as noted above, one skilled in the art will appreciate that registration information is received from the IMS network as a result of the registration of the OITF 100 using conventional means. Processor 144 determines, on the basis of information received from OITF 100 that OITF 100 is an ADM-enabled OITF. Upon such a determination having been made or upon every registration if all OITF nodes are predetermined to be ADM-enabled, ADM information assembled by processor 144 is transmitted to the AAS 108 through AAS interface 146.

Figure 6:
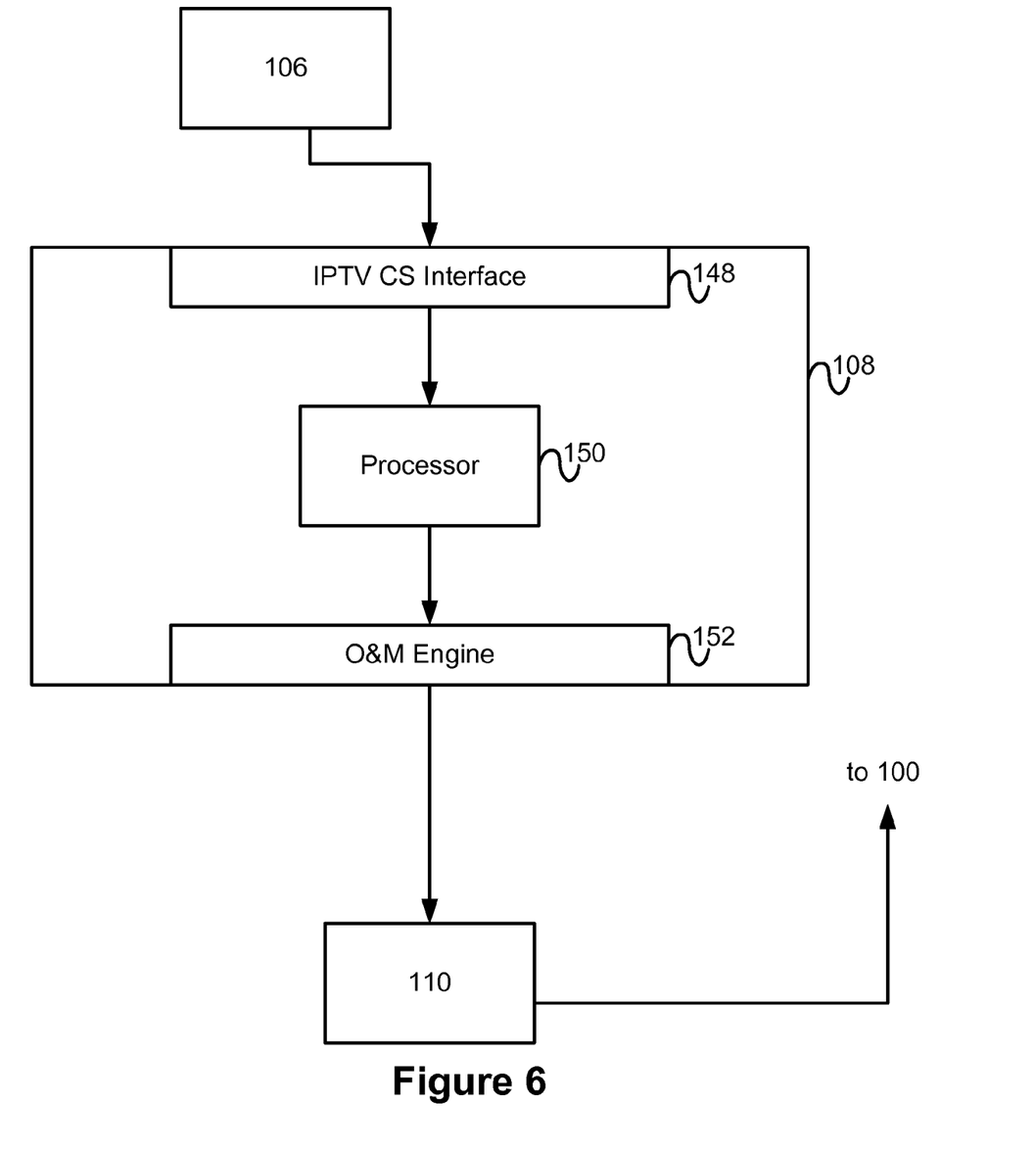
FIG. 6 is a block diagram illustrating an exemplary embodiment of a system of the present invention.

FIG. 6 is a block diagram illustrating an exemplary AAS 108 of the present invention. AAS 108 includes an IPTV CS interface 148, a processor 150 and an O&M engine 152. An IPTV CS such as IPTV CS 106 transmits information, such as ADM information, to IPTV CS interface 148 which receive this information on behalf of the AAS 108. Processor 150 extracts the address of an ADM from the received ADM information, and optionally extracts other configuration information at the same time. This extracted information is provided to O&M engine 152. O&M engine 152 configures ADS 110 to recognize an ADM at the extracted address. Optionally, other configuration information can be provided.

Figure 7:
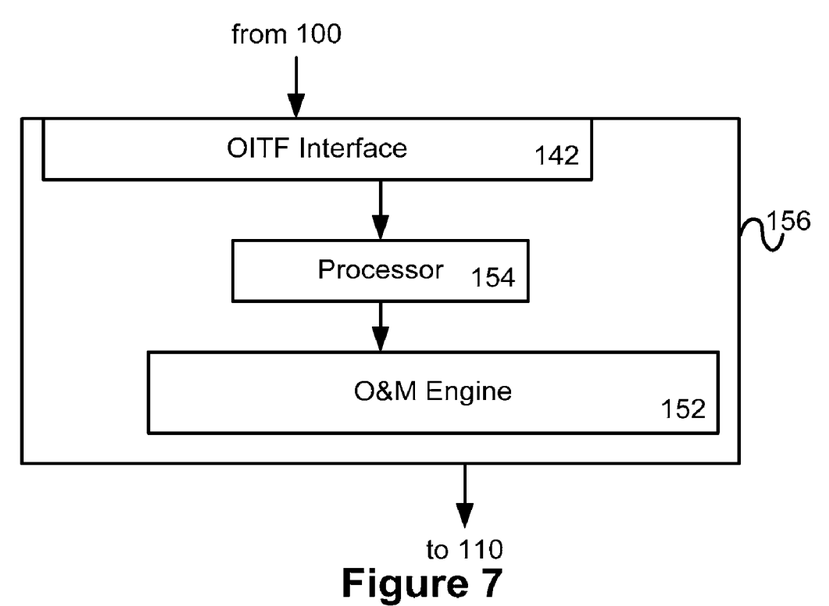
FIG. 7 is a block diagram illustrating an exemplary embodiment of a system of the present invention.

One skilled in the art will appreciate that though discussed above as separate nodes in the system, the IPTV Control Server and the Advertising Application Server can be implemented as a combined node. The nomenclature of this node is not germane to the following discussion, accordingly for the sake of simplicity with reference to FIG. 7 it will simply be referred to as an IPTV Control Server. FIG. 7 is a block diagram illustrating the functional components of an exemplary IPTV Control Server having embedded AAS functionality. Control server 156 includes an OITF interface 142 as discussed above with respect to FIG. 5, a processor 154 and an O&M engine 152 as discussed above with respect to FIG. 6. Upon initialization, or upon receipt of a new address, OITF 100 transmits registration information to control server 156 which is received by OITF interface 142. This information is processed by processor 154 to extract ADM information such as the address of the ADM for nodes that are determined to be ADM-enabled. Using the extracted information O&M engine 152 is used to configure AAS 110. One skilled in the art will appreciate that the combination of these functions relies upon IPTV CS 156 to understand the O&M procedures that may be specific to ADS 110.

Figure 8:
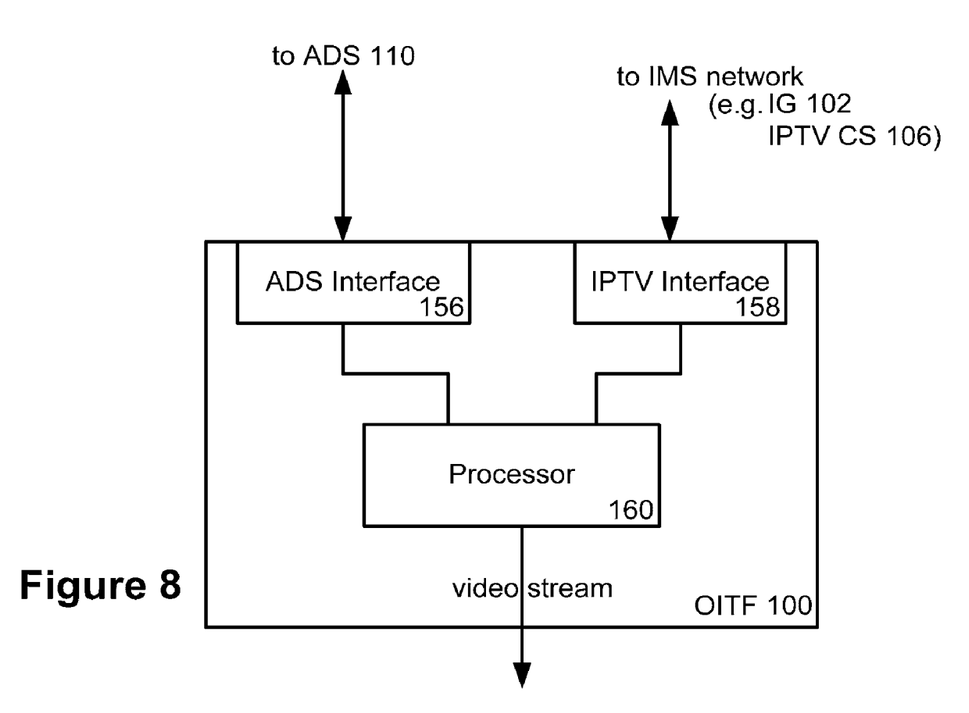
FIG. 8 is a block diagram illustrating an exemplary embodiment of an ADM-enabled OITF of the present invention.

FIG. 8 illustrates an exemplary logical element based embodiment of an ADM-enabled OITF 100. OITF 100 includes an ADS interface 156 and an IPTV Interface 158. The ADS interface 156 allows the OITF 100 to communicate with ADS 110, preferably in an SCTE-130 compliant manner. The IPTV Interface 158 allows OITF 100 to communicate with elements in the IMS network, such as IG 102, ASM 104 and IPTV CS 106 as outlined above. Through IPTV Interface 158, OITF 100 negotiates, requests and receives information related to streaming content, such as Content on Demand streams as well as conventional broadcast or multicast streams and in some embodiments the content includes games. In one embodiment, content streams received by OITF 100 have an associated extensible markup language (XML) file that indicates where advertisements are to be inserted. Processor 160 receives determines on the basis of either the content or data associated with the content that an advertisement is required, and requests the advertisement from ADS 110 through ADS interface 156. In the request for an advertisement, information such as the length of the advertisement, the geographical location (either specific or based on a large area), parameters describing the type of content included in the aforementioned XML file, user specific demographic information and other information that will be understood by those skilled in the art, can be included to allow ADS 110 to pick an advertisement relevant to the content and viewer. After ADS 110 selects an advertisement, it is sent to OITF 100 and received over ADS interface 156. The advertisement is inserted into the content stream by processor 160 and output as a video stream for display to the viewer. One skilled in the art will appreciate that the processor 160 requests advertisements, inserts the advertisements into the content stream, and in some embodiments decodes the content stream for rendering on a display. Other functionality provided by processor 160 to perform standard OITF-based tasks will be understood by those skilled in the art.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of registering an advertising management server (ADM) enabled Open IP TV Terminal Function (OITF) on an Internet Protocol Television network, the method comprising:
   receiving registration information associated with the OITF;
   determining, in accordance with information contained in the received registration information, that the OITF associated with the received registration information is an ADM-enabled OITF; and
   transmitting ADM information to an advertising application server to facilitate registration of the ADM-enabled OITF as an ADM with an SCTE-130 compliant Advertisement Decision Service (ADS).

2. The method of claim 1 further including the step of creating ADM information in accordance with the received registration information.

3. The method of claim 2 wherein the ADM information includes a network address uniquely associated with the ADM-enabled OITF.

4. The method of claim 1 wherein the step of transmitting the ADM information includes transmitting the ADM information to an Advertising Application Server for use in registering the ADM-enabled OITF with an Advertisement Selection Server.

5. A method of registering an advertising management server (ADM) enabled Open IP TV Terminal Function with a Advertisement Selection server, the method comprising:
   receiving advertisement management server (ADM) information from an Internet Protocol Television Control Server, the ADM information originating from an ADM-enabled OITF;
   extracting an address of the ADM-enabled IOTF from the received ADM information; and
   registering the ADM-enabled OITF associated with the extracted address with an Advertisement Selection Server (ADS).

6. The method of claim 5 wherein the step of registering includes registering the ADM using predefined operations and maintenance processes.

7. The method of claim 5 further including the steps of
   extracting configuration information from the ADM information; and
   configuring the ADM registration with the ADS in accordance with the extracted configuration information.

8. An Internet Protocol Television Control Server (IPTV CS) for registering an advertising management server (ADM) enabled Open Internet Protocol Television Terminal Function (OITF), the IPTV CS comprising:
   an OITF interface for receiving registration information from an ADM-enabled OITF through an Internet Multimedia Subsystem network;
   a processor for registering the OITF in response to receipt of the registration request, and for determining that the OITF is an ADM-enabled OITF; and
   an advertisement application server (AAS) interface for transmitting address information associated with the ADM-enabled OITF to an AAS in response to determination that registered OITF is an ADM-enabled OITF.

9. The IPTV CS of claim 8 wherein the processor includes means to generate ADM registration information on the basis of the registration request received by the OITF interface in response to determining that the OITF is an ADM-enabled OITF.

10. The IPTV CS of claim 9 wherein the ADM registration information includes the address associated with the ADM-enabled OITF.

11. The IPTV CS of claim 10 wherein the AAS interface includes means to transmit the address information encapsulated in the ADM registration information.

12. An Advertising Application Server for configuring an Advertising Decision Service (ADS), the Advertising Application Server comprising:
   an Internet Protocol Television Server (IPTV CS) interface for receiving registration information for an advertising management server (ADM) from an IPTV CS;

a processor for extracting an address associated with an ADM-enabled OITF from the received registration information; and an operations and maintenance engine for configuring the ADS to recognize the availability of the ADM-enabled OITF at the extracted address.

13. The AAS of claim 12 wherein the processor includes means to extract additional configuration information from the received registration information.

14. The AAS of claim 13 wherein the operations and maintenance engine includes means to configure the ADS in accordance with the additional configuration information.

15. An Internet Protocol Television Control Server comprising:

an Open Internet protocol television Terminal Function (OITF) interface for receiving a registration request from an advertising management server (ADM)-enabled OITF;

a processor for registering the ADM-enabled OITF in response to receipt of the registration request, for determining that the ADM-enabled OITF is an ADM-enabled OITF, and for generating ADM registration information having an address associated with the ADM-enabled OITF; and an operations and maintenance engine for configuring an Advertising Decision Server to recognize the ADM-enabled OITF at the associated address using the ADM generated registration information.

16. An advertising management server (ADM) enabled Open Internet protocol television Terminal Function (OITF) for receiving a content stream having markers indicating locations for advertisements and for inserting advertisements into the content stream at the indicated locations, the OITF comprising:

an Advertisement Decision Service (ADS) Interface for communicating with an Advertisement Decision Service to request and receive the advertisements;

an Internet Protocol Television (IPTV) interface for communicating with nodes of an Internet protocol Multimedia Subsystem to receive the content stream; and a processor for identifying markers associated with the content stream received through the IPTV interface, for requesting an advertisement through the ADS interface, for inserting an advertisement received through the ADS interface in response to the request into the content stream at a location, and for providing as an output a video stream incorporating the received advertisements and the received content stream.

17. The ADM-enabled OITF of claim 16 wherein the Advertisement Decision Service Interface is for communicating with an SCTE-130 compliant Advertisement Decision Service.

18. The ADM-enabled OITF of claim 16 wherein the ADS interface and the IPTV interface are integrated.

19. The ADM-enabled OITF of claim 16 wherein the markers indicating locations for advertisements are provided in a markup language file associated with the content stream, wherein the markup language file is received by the IPTV interface and is processed by the processor to identify the locations in the content stream where an advertisement is to be inserted.

20. The ADM-enabled OITF of claim 16 wherein the content stream is a television program.

21. The ADM-enabled OITF of claim 16 wherein the content stream is a game.

22. A method for inserting an advertisement into a content stream in an advertising management server (ADM) enabled Open Internet protocol television Terminal Function (OITF), the method comprising the steps of:

communicating with an Advertisement Decision Service (ADS) to request and receive the advertisement;

communicating with nodes of an Internet protocol Multimedia Subsystem (IMS) to receive the content stream having markers indicating one or more locations for advertisements and for inserting advertisements into the content stream at the indicated locations; and identifying the markers associated with the content stream received;

inserting the advertisement received at a location indicated by the markers within the content stream, and providing an output a video stream incorporating the received advertisement and the received content stream.

23. The method of claim 22 wherein the markers indicating locations for advertisements are provided in a markup language file associated with the content stream, wherein the markup language file is processed to identify the locations in the content stream where an advertisement is to be inserted.

24. The method of claim 22 wherein the content stream is a television program.

* * * * *

UNITED STATES PATENT AND TRADEMARK OFFICE
CERTIFICATE OF CORRECTION

PATENT NO. : 8,341,666 B2  Page 1 of 1
APPLICATION NO. : 12/609597
DATED : December 25, 2012
INVENTOR(S) : Foti It is certified that error appears in the above-identified patent and that said Letters Patent is hereby corrected as shown below:

In the Drawings:

In Fig. 2, Sheet 2 of 5, delete "an adress" and insert -- an address --, therefor.

In the Specifications:

In Column 3, Line 23, delete "an maintenance" and insert -- and maintenance --, therefor.

In the Claims:

In Column 10, Line 24, in Claim 5, delete "IOTF" and insert -- OITF --, therefor.

In Column 10, Line 32, in Claim 7, delete "steps of" and insert -- steps of: --, therefor.

Signed and Sealed this
Fourteenth Day of May, 2013

Teresa Stanek Rea
*Acting Director of the United States Patent and Trademark Office*